United States Patent [19]

Hemmingsen

[11] Patent Number: 5,107,613
[45] Date of Patent: Apr. 28, 1992

[54] ICE FISHING SIGNALLING APPARATUS

[76] Inventor: Edward H. Hemmingsen, 317 Brayton Point Rd., Westport, Mass. 02790

[21] Appl. No.: 604,712

[22] Filed: Oct. 29, 1990

[51] Int. Cl.$^5$ .................................................. A01K 85/01
[52] U.S. Cl. ................................................................ 43/17
[58] Field of Search ..................................................... 43/17

[56] References Cited

U.S. PATENT DOCUMENTS

| | | | |
|---|---|---|---|
| 2,448,346 | 8/1948 | Baugh et al. | 43/17 |
| 2,565,379 | 8/1951 | Laurila | 43/17 |
| 2,651,875 | 9/1953 | Brockman | 43/17 |
| 2,908,100 | 10/1959 | Mogren | 43/17 |
| 2,977,704 | 4/1961 | Tinsley | 43/17 |
| 3,196,570 | 7/1965 | Borisch | 43/17 |

Primary Examiner—Richard K. Seidel
Assistant Examiner—Patty E. Hong
Attorney, Agent, or Firm—John E. Toupal; Harold G. Jarcho

[57] ABSTRACT

An ice fishing apparatus including a pedestal adapted to be supported on an ice surface surrounding a fishing hole therein; a reel retained by the pedestal and adapted to retain fishing line to be used in water below the ice surface; and a standard retained by the pedestal means and adapted for movement between an extended signalling position and a retracted armed position. Also included is an actuator assembly operatively coupled between the standard and the reel and adapted for automatic operation by movement of the reel to induce movement of the standard from its retracted position to its extended position. The actuator comprises an elongated, open ended tube; a first end cap secured to the pedestal and press fitted into one open end of the tube; a second end cap secured to the pedestal and press fitted into an opposite open end of the tube; each of the end caps defining an opening aligned with said tube; and a rotatable shaft extending through the elongated tube and the openings in the first and second end caps, the shaft including an actuated portion disposed to be engaged by the reel in response to movement thereof and to thereby produce rotation of the shaft, and an actuator portion disposed to engage and move the standard into its extended position in response to rotation of the shaft. The tube aligns and protects the rotatable shaft while the end caps efficiently support the tube.

19 Claims, 3 Drawing Sheets

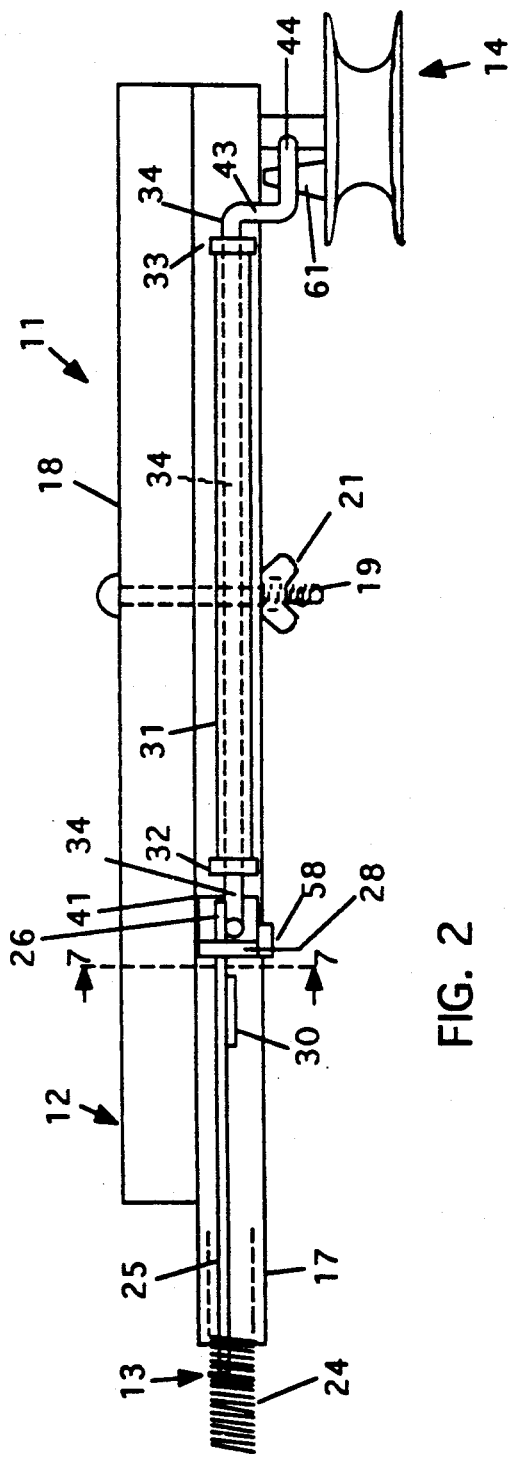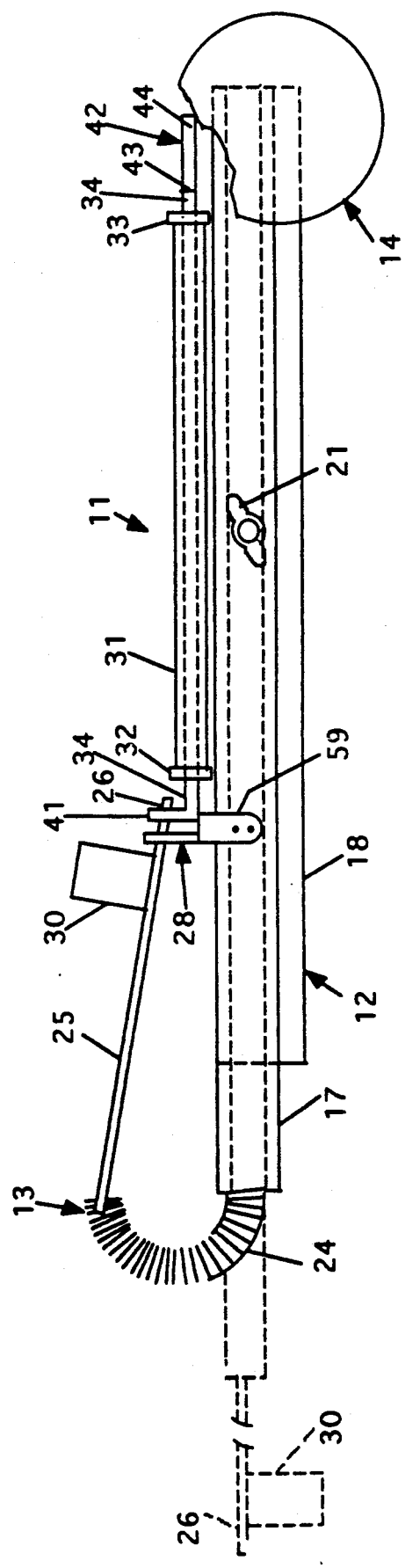

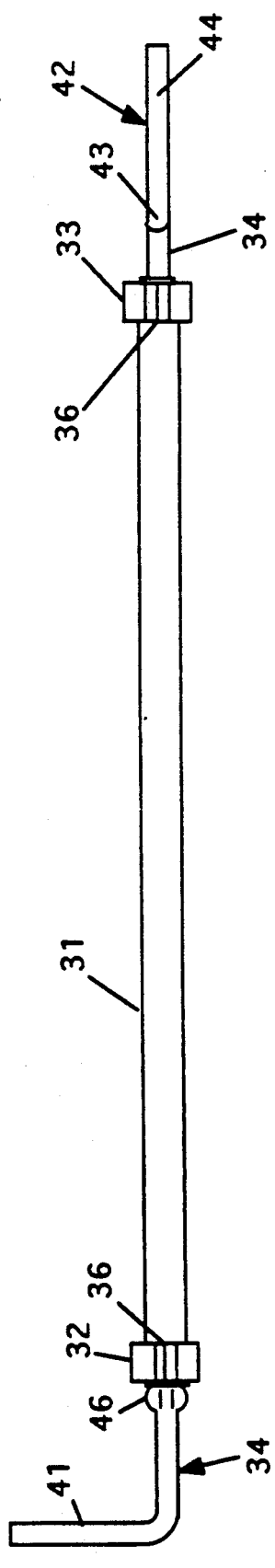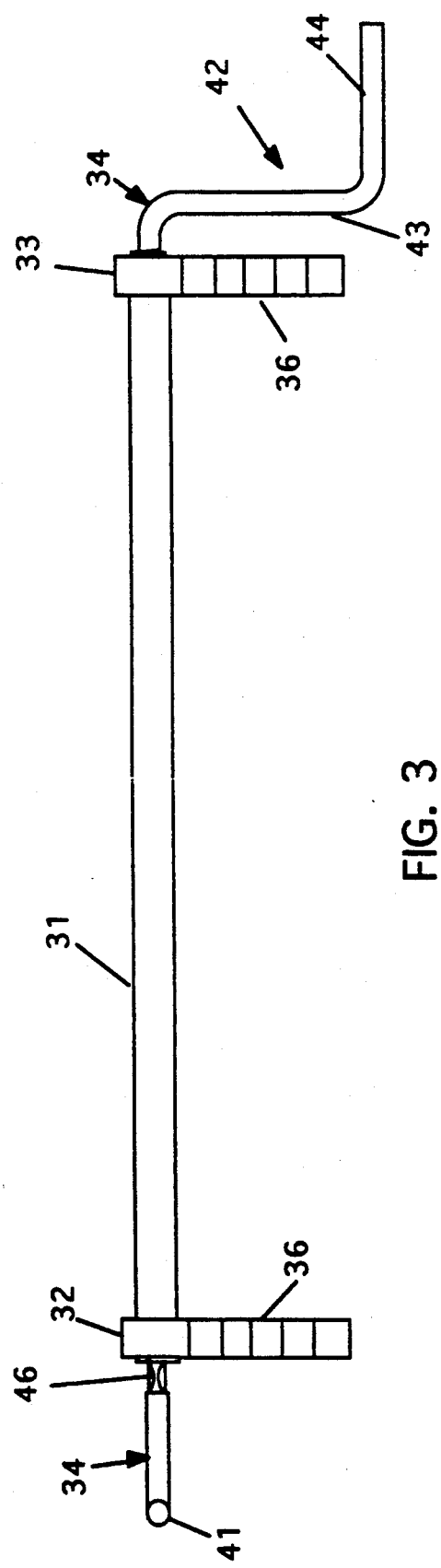

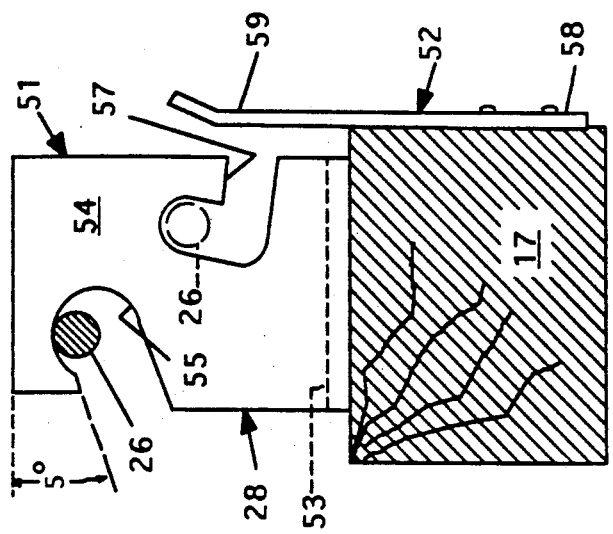
FIG. 7
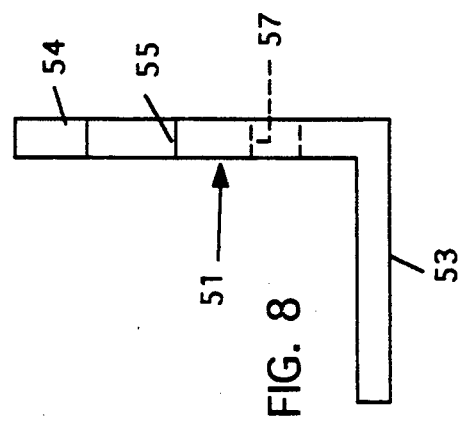
FIG. 8
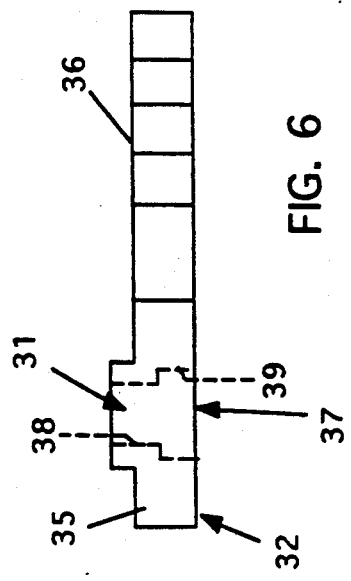
FIG. 6
FIG. 5
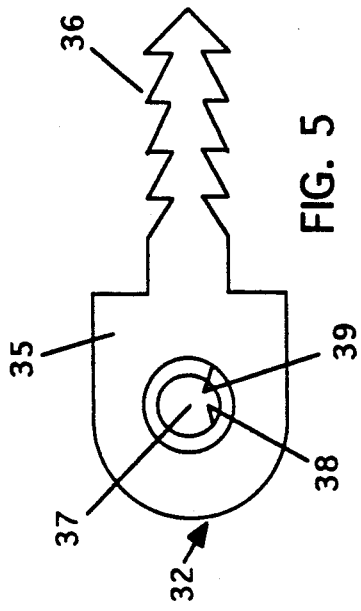

ICE FISHING SIGNALLING APPARATUS

BACKGROUND OF THE INVENTION

This invention relates generally to an ice fishing signalling device and, more particularly, to an ice fishing signalling device having improved signal flag retainer and actuator mechanisms.

Ice fisherman typically achieve highly satisfactory results with simple and economical tackle or equipment. Such equipment includes, for example, bite-indicating signalling devices such as are generally classified as tip-ups and which usually embody flags and the like to attract the user's attention in a well known manner. However, prior bite indicating signalling have suffered from various disadvantages such as high cost, unreliable operation, susceptibility to freeze lock-up, etc.

The object of this invention, therefore, is to provide an improved ice fishing signalling device.

SUMMARY OF THE INVENTION

The invention is an ice fishing apparatus including a pedestal adapted to be supported on an ice surface surrounding a fishing hole therein; a reel retained by the pedestal and adapted to retain fishing line to be used in water below the ice surface; and a standard retained by the pedestal means and adapted for movement between an extended signalling position and a retracted armed position. Also included is an actuator assembly operatively coupled between the standard and the reel and adapted for automatic operation by movement of the reel to induce movement of the standard from its retracted position to its extended position. The actuator comprises an elongated, open ended tube; a first end cap secured to the pedestal and press fitted into one open end of the tube; a second end cap secured to the pedestal and press fitted into an opposite open end of the tube; each of the end caps defining an opening aligned with said tube; and a rotatable shaft extending through the elongated tube and the openings in the first and second end caps, the shaft including an actuated portion disposed to be engaged by the reel in response to movement thereof and to thereby produce rotation of the shaft, and an actuator portion disposed to engage and move the standard into its extended position in response to rotation of the shaft. The tube aligns and protects the rotatable shaft while the end caps efficiently support the tube.

According to one feature of the invention, the tube is filled with a low temperature lubricant. Smooth operation of the actuator is enhanced by the low temperature lubricant.

According to other features of the invention, the openings in each end cap is defined by a first bore portion having a first diameter conforming substantially to the shaft and a counterbore portion of greater diameter than said first diameter and press fittedly receiving the tube. The end caps function both as closures for the tube and bearing surfaces for the rotatable shaft.

According to yet another feature of the invention, the pedestal comprises a wooden portion retaining the actuator, and each of the end caps comprises a serrated shank embedded in the wooden portion. The serrated shanks permit the end caps to additionally function as securement means for the actuator.

According to still other features of the invention, the actuator shaft comprises a swedged portion disposed between the tube and the actuator portion, and each of actuator and actuated portions comprises an arm extending transversely from the shaft. The wedged portion restricts axial movement of the shaft and the actuated and actuator arms facilitate reliable operation of the actuator assembly.

In a featured embodiment of the invention, the standard comprises an elongated resilient member having an attached end secured to the pedestal and an opposite signal end normally disposed in the extended position but being manually deflectable into the retracted position. A retainer is secured to the pedestal and is adapted to receive and retain the signal end of the resilient member in its retracted position. Forming the retainer is a bracket defining an active slot for receiving and releaseably latching the signal end in an armed retracted position, and a storage slot for receiving and releaseably locking the signal end in a retracted storage position physically isolated from the actuator assembly. The provision of both active and storage slots enhances practical use of the device.

According to a further feature, the device includes a fence disposed to partially obstruct removal of the signal end from the storage slot. The fence prevents inadvertent movement of the standard to its extended position.

DESCRIPTION OF THE DRAWINGS

These and other objects and features of the invention will become more apparent upon a perusal of the following description taken in conjunction with the accompanying drawings wherein:

FIG. 1 is a side view of an ice fishing apparatus according to the invention;

FIG. 2 is a top view of the apparatus shown in FIG. 1;

FIG. 3 is a detailed side view of an actuator mechanism used with the apparatus shown in FIGS. 1 and 2;

FIG. 4 is a top view of the actuator mechanism shown in FIG. 3;

FIG. 5 is a detailed plan view of an end cap used in the actuator mechanism shown in FIGS. 3 and 4;

FIG. 6 is a side view of the end cap shown in FIG. 5;

FIG. 7 is a cross-sectional view taken along lines 7—7 in FIG. 2; and

FIG. 8 is a side view of the retainer mechanism shown in FIG. 7.

DESCRIPTION OF THE PREFERRED EMBODIMENT

An ice fishing signalling device 11 includes a pedestal 12 supporting at one end a standard 13; at an opposite end a reel 14 and an intermediate actuator assembly 16 straddled thereby. The pedestal 12 includes an elongated wooden primary rod portion 17 and an auxilliary wooden cross piece 18 secured thereto by a bolt 19 and wing nut 21. After loosening of the wing nut 21, the cross piece 18 can be pivoted between a storage position parallel and in juxtaposed to the primary rod 17 shown in FIGS. 1 and 2 and an operative position transverse thereto. When in the transverse position, the cross piece 18 functions in a conventional manner to support the pedestal 12 on an ice surface surrounding a fishing hole (not shown).

The rotatable reel 14 is adapted to retain a spool of fishing line (not shown) that can be used in a conventional manner with a hook or the like during fishing operations. With the device 11 properly positioned over an ice fishing hole, the pedestal 12 is retained by the cross piece 18 in a substantially vertical orientation with the reel 14 projecting downwardly into the hole that has been formed in the ice.

The standard 13 includes a flexible spring portion 24 attached to one end of the elongated rod 17. Also included in the standard 13 and secured to the spring portion 24 is a pole portion 25 terminating at a signal end 26 with a flag 30. The flexible standard 13 is normally retained by the spring portion 24 in an extended position shown by dashed lines in FIG. 1 but can be deflected into a retracted position shown by solid lines in FIGS. 1 and 2. Retaining the standard 13 in its retracted position is a retainer assembly 28 attached to the elongated rod 17.

As shown most clearly in FIGS. 3-6, the actuator 16 includes an elongated open ended tube 31, first and second identical end caps 32, 33 and a rotatable shaft 34. Each of the end caps 32, 33 includes a body portion 35 joined to a serrated shank portion 36. Extending through the body portion 35 is an opening 37 formed by a first bore portion 38 and a counterbore portion 39. Opposite ends of the elongated tube 31 are press fitted into the counterbores 39 of the end caps 32, 33. Thus the end caps 32, 33 close the open ends of the elongated tube 31 which is preferably filled with a suitable low temperature lubricant.

The rotatable shaft 34 extends through the elongated tube 31 and the openings 37 in the end pieces 32, 33, the serrated shank portions 36 of which are embedded into the wooden rod 17. Forming bearing surfaces for the rotatable shaft 34 are the first bore portions 38 of the end caps 32, 33. One end of the rotatable shaft 34 terminates with an actuator arm portion 41 extending transversely thereto. Similarly terminating an opposite end of the rotatable shaft 34 is an actuated arm 42 having an inner portion 43 extending transversely to the shaft 34 and an outer portion 44 extending parallel thereto. Longitudinal axial movement of the rotatable shaft 34 in a direction toward the reel 14 is prevented by a crimped portion 46 located between the arm 41 and the end cap 32.

The retainer assembly 28 includes a retainer bracket 51 and a fence plate 52. A base portion 53 of the bracket 51 is attached to the elongated rod 17 while an upright plate portion 54 extends therefrom perpendicular to its longitudinal axis. Formed in one edge of the upright portion 54 is an active slot 55 having a retaining edge 56 oriented at an angle of 5° to the longitudinal axis to a plane extending parallel to the elongated rod 17. Formed in an opposite edge of the upright portion 54 is a storage slot 57 extending first inwardly and then upwardly and away from the rod 17. The fence plate 52 has one portion 58 secured to the rod 17 and an outer portion 59 juxtaposed the storage slot 57 so as to partially obstruct access thereto.

OPERATION

After mounting of the pedestal 12 over an ice fishing hole and dropping a baited line (not shown) from the reel 14 into the fishing waters covered by the ice, the flexible standard 13 is deflected into its retracted armed position shown in FIGS. 1 and 2. The signal end 26 of the standard 13 is inserted into and retained within the active slot 55 and extending transversely to the actuator arm 41 (FIG. 7). With the actuator arm 41 in its armed position, the outer end 44 of the actuated arm portion 42 extends parallel to the rod 17 and aligned with an outwardly projecting tab 61 on an inner surface of the reel 14 (FIG. 2). In response to clockwise rotation of the reel 14 produced by movement of a hooked fish, the tab 61 engages the outer portion 44 of the actuated arm 42 producing rotation of the rotatable shaft 34 within the elongated tube 31. That rotation causes the actuator arm portion 41 of the rotatable shaft 34 to engage and move the signal end 26 out of the active slot 55 allowing the spring portion 24 to move the standard 13 into its extended position shown by dashed lines in FIG. 1 and thereby indicating the presence of a hooked fish.

When the device 11 is not in use, the standard 13 can be conveniently deflected into a storage position with the signal end 26 inserted into the storage slot 57 as shown by dashed lines in FIG. 7. The standard 13 is securely retained in its stored retracted position by the fence plate outer portion 59 which partially obstructs removal of the signal end 26 from the slot 57. Removal of the end 26 from the slot 57 requires the exertion of force to spring the fence plate 51 outwardly after which the standard 13 can be prepared for use by insertion into the active slot 55 as described above.

Obviously, many modifications and variations of the present invention are possible in light of the above teachings. It is to be understood, therefore, that the invention can be practiced otherwise than as specifically described.

What is claimed is:

1. An ice fishing apparatus comprising:
pedestal means adapted to be supported on an ice surface surrounding a fishing hole therein;
reel means retained by said pedestal means and adapted to retain fishing line to be used in water below the ice surface;
an elongated resilient member having an attached end secured to said pedestal and an opposite signal end normally disposed in an extended position and being manually deflectable into a retracted position;
actuator means operatively coupled between said standard means and said reel means and adapted for automatic operation by movement of said reel means to induce movement of said standard means from said retracted position to said extended position; said actuator means comprising an elongated, open ended tube; a first end cap secured to said pedestal means and press fitted into one open end of said tube; a second end cap secured to said pedestal means and press fitted into an opposite open end of said tube; each of said end caps defining an opening aligned with said tube; and a rotatable shaft means extending through said elongated tube and said openings in said first and second end caps, said shaft means comprising an actuated portion disposed to be engaged by said reel in response to movement thereof and to thereby produce rotation of said shaft and an actuator portion disposed to engage and move said standard means into said extended position in response to rotation of said shaft; and
a retainer means secured to said pedestal means and adapted to receive and retain said signal end of said resilient member in said retracted position, said retainer means comprising a bracket defining an active slot for receiving and releaseably latching said signal end in said retracted position, and a storage slot for receiving and releaseably locking said signal end in a retracted storage position physically isolated from said actuator means.

2. An apparatus according to claim 1 including a lubricant means retained by said tube.

3. An apparatus according to claim 2 wherein each of said openings is defined by a first bore portion having a first diameter conforming substantially to said shaft so as to function as a bearing surface therefor, and a counterbore portion of greater diameter than said first diameter and press fittedly receiving said tube.

4. An apparatus according to claim 3 wherein said pedestal means comprises a wooden portion retaining said actuator means, and each of said end caps comprises a serrated shank embedded in said wooden portion.

5. An apparatus according to claim 4 wherein said shaft comprises a swedged portion disposed between said tube and said actuator portion.

6. An apparatus according to claim 5 wherein each of actuator and actuated portions comprises an arm extending transversely from said shaft.

7. An apparatus according to claim 1 including a fence means disposed to partially obstruct removal of said signal end from said storage slot.

8. An apparatus according to claim 7 wherein said active slot is formed in one edge of said bracket and said storage slot is formed in an opposite edge thereof.

9. An apparatus according to claim 8 including a lubricant means retained by said tube.

10. An apparatus according to claim 9 wherein each of said openings is defined by a first bore portion having a first diameter conforming substantially to said shaft so as to function as a bearing surface therefor, and a counterbore portion of greater diameter than said first diameter and press fittedly receiving said tube.

11. An apparatus according to claim 10 wherein said pedestal means comprises a wooden portion retaining said actuator means, and each of said end caps comprises a serrated shank embedded in said wooden portion.

12. An apparatus according to claim 11 wherein said shaft comprises a wedged portion disposed between said tube and said actuator portion.

13. An apparatus according to claim 12 wherein each of actuator and actuated portions comprises an arm extending transversely from said shaft.

14. An ice fishing apparatus comprising:
pedestal means adapted to be supported on an ice surface surrounding a fishing hole therein;
reel means retained by said pedestal means and adapted to retain fishing line to be used in water below the ice surface;
standard means retained by said pedestal means and adapted for movement between extended and retracted positions; said standard means comprising an elongated resilient member having an attached end secured to said pedestal means and an opposite signal end normally disposed in said extended positions, said resilient member being manually deflectable into said retracted position;
actuator means operatively coupled between said standard means and said reel means and adapted for automatic operation by movement of said reel means to induce movement of said standard means from said retracted position to said extended position; and
retainer means secured to said pedestal means and defining an active slot receiving and releaseably latching said signal end in a retracted active position, and a storage slot for receiving and releaseably latching said signal end in a storage position physically isolated from said actuator means.

15. An apparatus according to claim 14 including a fence means disposed to partially obstruct removal of said signal end from said storage slot.

16. An apparatus according to claim 15 wherein said active slot is formed in one edge of said bracket and said storage slot is formed in an opposite edge thereof.

17. An apparatus according to claim 16 wherein said active slot comprises a retaining edge adapted to engage said signal end and oriented at an angle of about 5° to a plane parallel to said pedestal.

18. An ice fishing apparatus comprising:
pedestal means comprising a wooden portion and adapted to be supported on an ice surface surrounding a fishing hole therein;
reel means retained by said pedestal means and adapted to retain fishing line to be used in water below the ice surface;
standard means retained by said pedestal means and adapted for movement between extended and retracted positions; and
actuator means operatively coupled between said standard means and said reel means and adapted for automatic operation by movement of said reel means to induce movement of said standard means from said retracted position to said extended position; said actuator means comprising an elongated, open ended tube; a first end cap secured to said pedestal means and press fitted into one open end of said tube; a second end cap secured to said pedestal means and press fitted into an opposite open end of said tube; each of said end caps defining an opening aligned with said tube; and a rotatable shaft means extending through said elongated tube and said openings in said first and second end caps, said shaft means comprising an actuated portion disposed to be engaged by said reel in response to movement thereof and to thereby produce rotation of said shaft and an actuator portion disposed to engage and move said standard means into said extended position in response to rotation of said shaft; and wherein each of said end caps comprising a serrated shank embedded in said wooden portion so as to support said tube on said pedestal means.

19. An apparatus according to claim 18 wherein each of said openings is defined by a first bore portion having a first diameter conforming substantially to said shaft so as to function as a bearing surface therefor, and a counterbore portion of greater diameter than said first diameter and press fittedly receiving said tube.

* * * * *